United States Patent [19]
Johannsen et al.

[11] Patent Number: 5,366,378
[45] Date of Patent: Nov. 22, 1994

[54] VISUAL TEACHING AID

[75] Inventors: Kenneth L. Johannsen, Arlington Heights; Raymond Avischious, Rolling Meadows, both of Ill.

[73] Assignee: NEK Enterprises, Inc., Arlington Heights, Ill.

[21] Appl. No.: 57,183

[22] Filed: May 3, 1993

Related U.S. Application Data

[63] Continuation of Ser. No. 714,858, Jun. 13, 1991, abandoned.

[51] Int. Cl.⁵ ............................................. G09B 19/00
[52] U.S. Cl. ..................................... 434/187; 434/191; 434/195
[58] Field of Search ............... 434/188, 189, 187, 191, 434/195, 197–199, 200, 202–205, 322, 365, 405, 416, 421, 430, 327, 348, 428, 429

[56] References Cited

U.S. PATENT DOCUMENTS

| | | | |
|---|---|---|---|
| 1,683,827 | 9/1928 | Ingram | 434/430 |
| 2,647,327 | 8/1953 | Guichard | 434/430 |
| 2,915,834 | 12/1959 | Burch et al. | 434/191 |
| 3,410,002 | 11/1968 | Mulholland et al. | 434/195 |
| 4,144,657 | 3/1979 | Dumovich | 434/195 X |
| 4,192,085 | 3/1980 | Bonorand | 434/191 |
| 4,842,521 | 6/1989 | Johansen | 434/187 |

*Primary Examiner*—Richard J. Apley
*Assistant Examiner*—Glenn Richman
*Attorney, Agent, or Firm*—Leydig, Voit & Mayer, Ltd.

[57] ABSTRACT

A visual teaching aid adapted for the versatile teaching of various mathematical relationships, incremental scales, and other sequential and educational concepts. The teaching aid includes an elongated board, a plurality of elongated insert cards each being interchangeably mountable on the board and having numerical indicia on a face thereof, and at least two pointers that are supported for movement along the board for pointing selected indicia on the insert card and for movement relative to each other. The insert cards are removably mountable on the board without removal and replacement of auxiliary fastening means and can be used in conjunction with relatively small sized base or whole number insert cards to assist in drills of mathematical relationships.

39 Claims, 4 Drawing Sheets

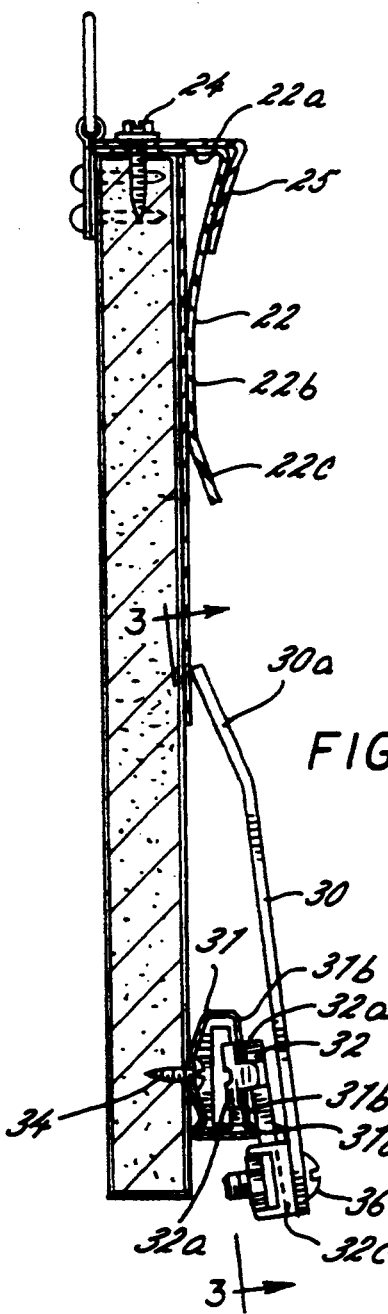
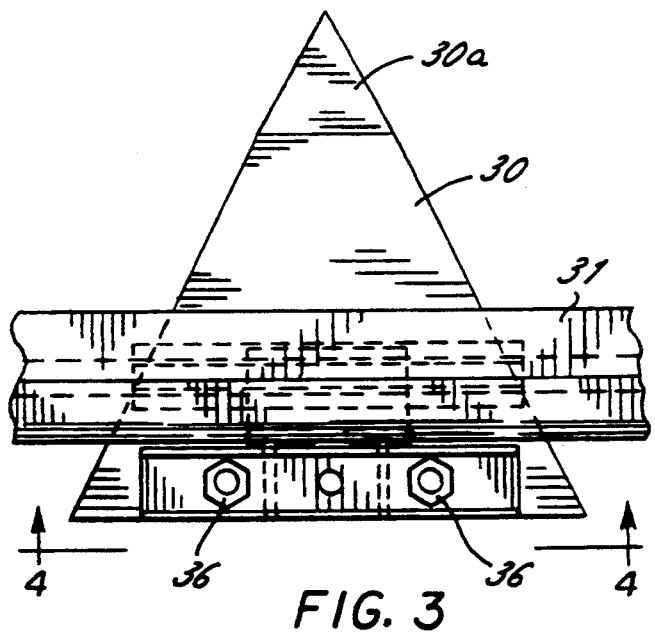
FIG. 3
FIG. 2
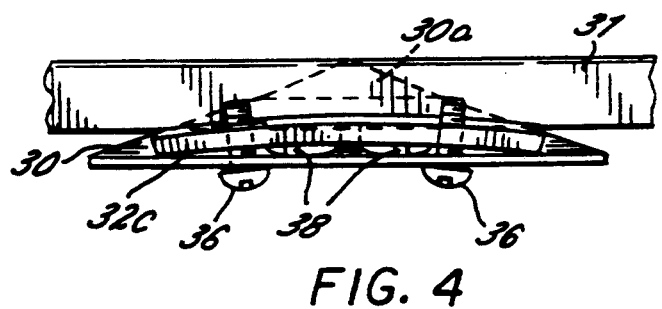
FIG. 4

VISUAL TEACHING AID

This is a continuation of copending application(s) Ser. No. 07/714,858, filed June 13, 1991, now abandoned.

FIELD OF THE INVENTION

The present invention relates generally to teaching aids, and more particularly, to a visual aid for teaching dimensional, mathematical, incremental relationships, and other scales and educational concepts.

BACKGROUND OF THE INVENTION

Teaching of dimensional, mathematical, and other incremental relationships, such as temperature scales, logarithmic scales and the like, to groups of students in a classroom environment often has created difficulties, both from the instructor's ability to easily demonstrate visually the information he is attempting to convey and the ability of the student to see and understand such visual information. Rulers, temperature scales, and other incrementally graduated scales generally are small in size and the graduations on the scale are so minute that the instructor often can effectively demonstrate the use of the scale to only one or two students at a time. In an effort to satisfy these problems, Johannsen U.S. Pat. No. 4,842,521 discloses a visual aid ruler that includes an enlarged ruler scale and a selectively adjustable pointer to facilitate teaching use of the scale. The effectiveness of the ruler, however, is limited. The ruler is not adapted for easily teaching mathematical relationships, such as addition, subtraction, and multiplication, and use of the ruler is limited to the particular scale depicted on the face thereof.

OBJECT AND SUMMARY OF THE INVENTION

It is an object of the present invention to provide a visual teaching aid adapted for more effectively teaching students various mathematical relationships, as well as ruler and other incremental scales.

Another object is to provide a visual teaching aid of the above kind that is relatively simple in construction and operation.

Other objects and advantages of the invention will become apparent upon reading the following detailed description and upon reference to the drawings, in which:

BRIEF DESCRIPTION OF THE DRAWINGS

FIG. 2 is an enlarged vertical section of the illustrated teaching aid;

FIG. 3 is an enlarged plan view, in partial section, taken in the plane of line 3—3 in FIG. 2;

FIG. 4 is a bottom view of the pointer shown in FIG. 3, taken in the plane of line 4—4.

Figure 1:
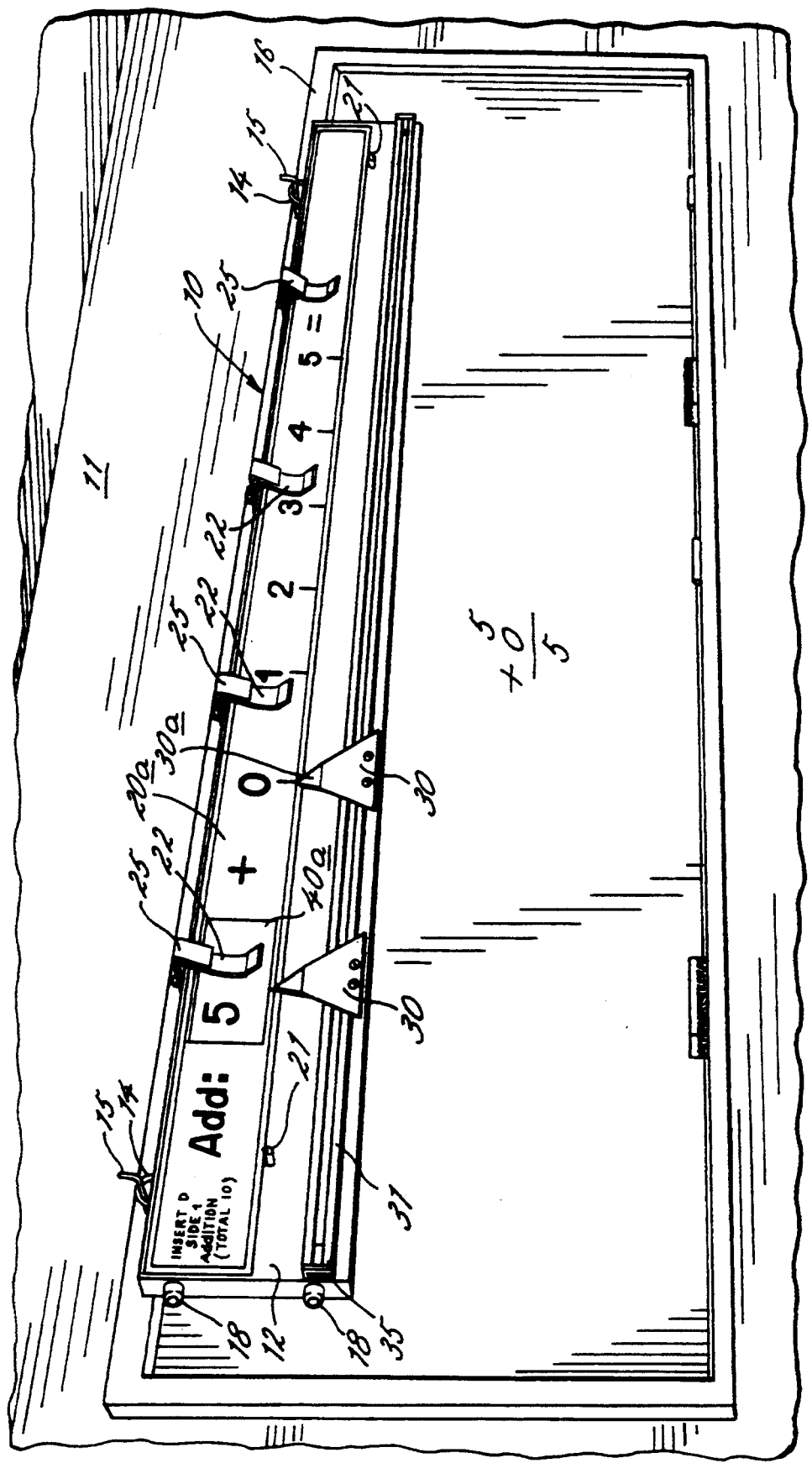
FIG. 1 is a perspective of an illustrated teaching aid embodying the present invention shown mounted on the wall of a classroom.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DESCRIPTION OF THE PREFERRED EMBODIMENT

Referring now more particularly to the drawings, there is shown an illustrative visual teaching aid 10 embodying the present invention mounted on the wall 11 of a classroom. The teaching aid 10 includes an elongated board 12 sized so as to be readily observable by a group of students in the room. Preferably, the board has a length on the order of 5 feet and depth of about 8 inches. Means in the form of eyelets 14 are provided on the top side of the board 12 for permitting horizontal mounting thereof in a classroom, such as from hooks 15 or the like that may be located along the top of a blackboard 16. Resilient bumpers 18 are provided on one or both ends of the board to cushion accidental bumping of the ends when being hung or during transport from one classroom to another, or for facilitating standing of the board 12 on end for storage.

In accordance with one aspect of the invention, the visual aid includes a plurality of interchangeable elongated inserts that are removably mountable on a front face of the board and extend substantially the length thereof to facilitate teaching of selected mathematical relationships, incremental scales, or other educational concept as depicted on the front faces of the inserts. To this end, a plurality of identically sized elongated inserts 20a–20k are mounted in overlapping relation to each other adjacent a forward face of the board 12, with each insert having indicia thereon in the form of a particular numbering system or legend for teaching a particular mathematical relationship, scale, or other information. The outermost insert, designated 20a in FIG. 1, is positioned with its respective numbering system or scale in forwardly facing relation for use with the visual teaching aid 10. The other inserts 20b–20k may be mounted in stored underlying relation to the outermost insert 20a for easy access and interchangeability. The inserts 20a–20k may be made of cardboard, plastic, or other suitable material. To minimize the number of inserts, scales or mathematical legends may be provided on opposite sides of each insert. For supporting the underside of the inserts 20a–20k on the board 12, a pair of longitudinally spaced support pins or posts 21 are disposed in outwardly extending relation to the face of the board 12 upon which the inserts rest.

For releasably engaging and retaining the upper peripheral portions of the inserts 20a–20k, a plurality of longitudinally spaced retention clips 22, preferably made of clear plastic or like transparent material, are mounted along the top of the board 12. The retention clips 22 in this case are L-shaped, with legs 22a, 22b forming an acute angle of about 60" (FIG. 2). The transparent retention clips 22 are mounted on the board with one leg 22a adjacent a top side thereof and its other leg 22b depending in downwardly and rearwardly curved fashion for resilient engagement with a front side of the forwardmost insert 20a. The depending insert engaging leg 22b preferably terminates with an outwardly flared terminal end portion 22c that facilitates positioning of the upper peripheral edge of an insert 20a between the transparent retention clip 22 and the board 12 during mounting. Mounting screws 24 in this instance extend through the upper leg 22a into the top of the board 12. Tightening of the mounting screws 24 force the upper leg 22a against the top of the board 12, which in turn resiliently forces the depending leg 22b into engagement with the forward face of the board or the insert mounted thereon.

To prevent excessive bending and possible breakage of the transparent plastic retention clips 22 during mounting and removal of the inserts 20a–20k, each retention clip 22 has a generally L-shaped reinforcing clip 25, also made of clear plastic material, mounted in overlapping relation about the upper leg 22a and an upper portion of the depending leg 22b of the retention clip 22. The L-shaped reinforcing clip 25, which forms an angle substantially similar to the angle defined by the retention clip 22 tends to reinforce and prevent bending and possible breakage of the transparent retention clips 22 at the juncture of the legs 22a, 22b. The transparent retention clips 22 and reinforcing clips 25 preferably have sufficient flexibility for holding a plurality of the inserts 20a–20k on the board, hence enabling easy storage of the inserts which are not in use.

In accordance with an important aspect of the invention, two or more selectively positionable pointers 30 are provided which in cooperation with selected inserts 20a–20k are adapted to enhance teaching of a multiplicity of mathematical relationships and incremental scales. The pointers 30 each have a "V"-shaped configuration and are supported adjacent the bottom of the board 12 with the tip in upwardly oriented close relation to the bottom of the outermost insert 20a and the legend or numbering system depicted thereon. The pointers 30 each are mounted in upwardly and rearwardly extending relation and have an upper portion 30a angled rearwardly so that the tip thereof is in close relation to the insert. With the tip mounted in such fashion it will be understood that relatively accurate readings and measurements can be made even when the pointers 30 are viewed by students from different locations within the classroom, and thus, different perspectives of the pointers 30 and board 12. The pointers 30 preferably are made of bright colored plastic material, such as orange, and extend upwardly about one-half the depth of the board 12 so as to be easily observable. The pointers 30 and forwardly facing insert 20a, therefore, both can be observed without the pointer impeding viewing of the numbered legend, scale or other indicia on the insert.

For supporting the pointers 30 for relative longitudinal movement with respect to the board 12 and the insert 20a displayed thereon, a track 31 is mounted along the bottom of the board 12 and each pointer 30 is disposed on a respective slide 32 that is moveable within the track 30. The track 31 in this instance is a generally "C"-shaped tubular channel having a base 31a fixed to the face of the board 12 adjacent a bottom peripheral edge thereof by fasteners 34. The track 31 has opposed, inwardly directed flanges 31b that define a guide slot within which the slide 32 of each pointer 30 is mounted. The illustrated guide track 31 has a bottom lip 31c extending forwardly of the plane of the slot defined by the flanges 31b for orienting the upper portion of the pointer in a rearwardly directed fashion toward the face of the board 12 and the insert 20a mounted thereon. Appropriate stops 35 (FIG. 1) are provided at opposite ends of the track 31 for retaining the pointer slides 32 within the track.

Each slide 32 in this case is an elongated member, preferably formed of plastic or other slightly resilient material, having a rearward portion 32a within the track 31 sized larger than the width of the slot defined by the flanges 31b and a forward portion 32b extending through the slot and supporting a depending pointer mounting flange 32c that extends downwardly below the bottom of the track 31. The pointer 30 is secured to the mounting flange 32c by a pair of mounting bolts or rivets 36 through aligned laterally spaced apertures in the mounting flange 32c and a lower peripheral the base portion of the pointer 30. The slide 32 preferably is molded plastic piece with the rear portion 32a, forward portion 32b, and depending flange 32c integrally formed. Such slide 32 may be assembled in the track from an end thereof prior to insertion of the stops 35.

In keeping with the invention, the pointer slides 32 are mounted within the track 31 with a selectively determined friction drag that permits easy manual movement of the pointers 30 along the track, but which prevents accidental displacement of the pointers 30 once positioned, as well as free sliding movement of the pointers during transport and handling of the board 12. For this purpose, each pointer mounting flange 32c is formed with a pair of longitudinally spaced forwardly extending dimples 38, located between the apertures for mounting bolts 36. The slide 32 preferably is made of slightly more resilient plastic material than the pointer 30, such that upon tightening of the mounting bolts 36 the slide mounting flange 32c will become bowed with a central portion thereof bearing against the forwardly extending lip 31c of the guide track 31. The more tightly the mounting bolts 36 are secured, the greater the bow of the slide mounting flange 32c, and the greater the bearing pressure of the bowed mounting flange 32c against the track lip 31c. Hence, the frictional drag of the movement of the pointer mounting slide 32 may be selectively established. The drag preferably is set so as to permit relatively easy manual positioning of the pointers 30 along the track 31, but upon selected positioning, the pointers 30 are not susceptible to movement from accidental jarring of either the pointers 30 or the board 12.

In use, the teaching aid 10 may facilitate the demonstration and teaching of a variety of numbering sequences, mathematical relationships, scales, and other sequential information. When a selected insert is mounted on the board 12, one of the pointers 30 may be used to drill students in their awareness and understanding of the basic numbering sequence. The use of two pointers permits greater use of the teaching aid 10 for practicing a broad variety of mathematical relationships and other concepts related to basic education.

Figure 5:
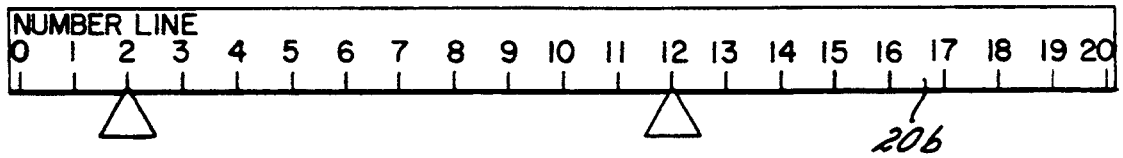
FIGS. 5–14 show diagrammatically a use of a variety of alternative insert cards for use with the illustrated teaching aid.
Figure 6:
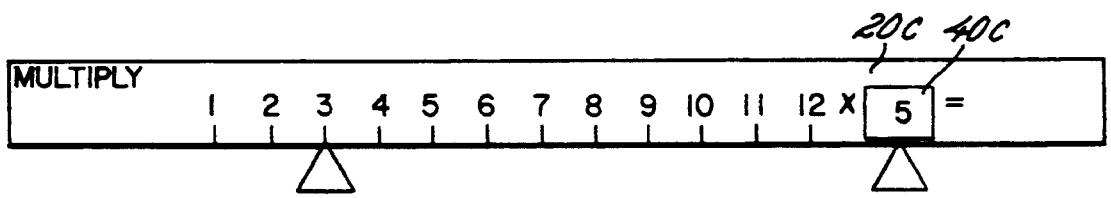
Figure 7:
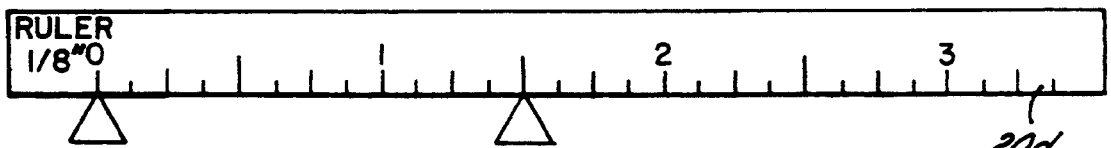
Figure 8:
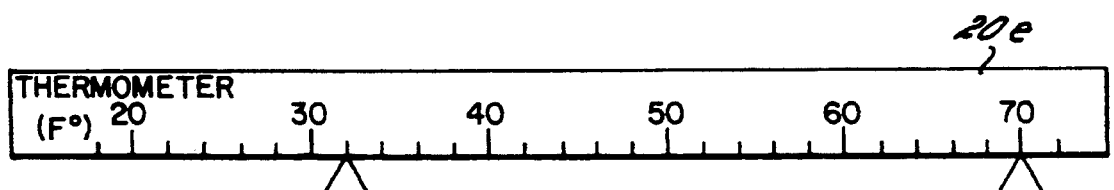
Figure 9:
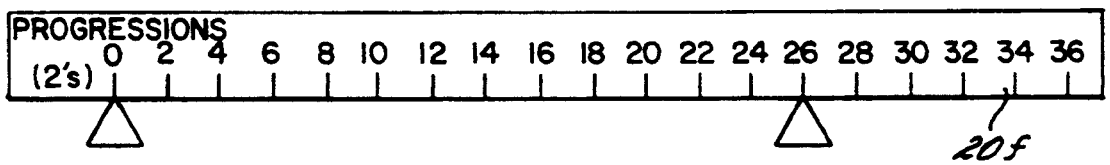
Figure 10:
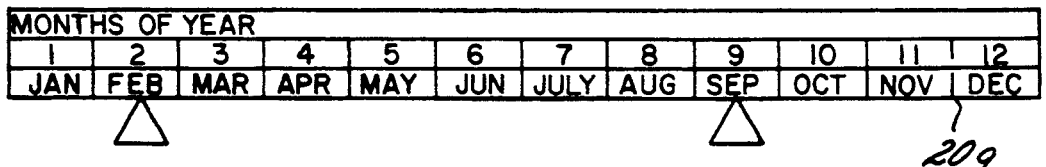
Figure 11:
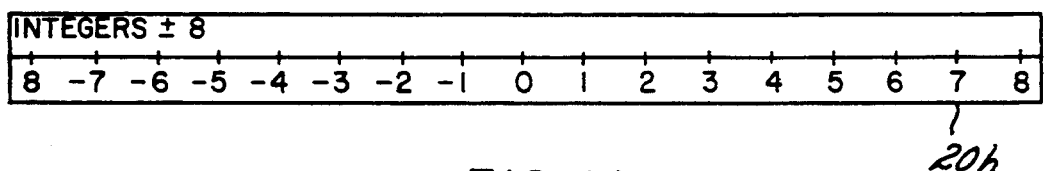
Figure 12:
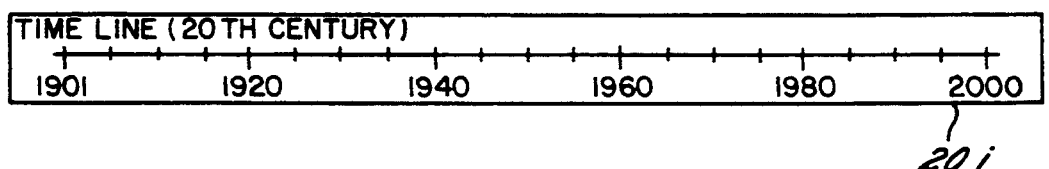
Figure 13:
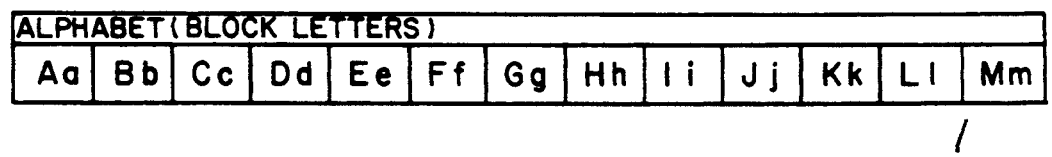
Figure 14:
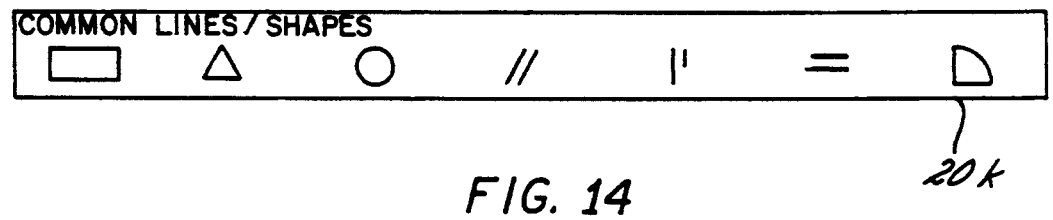

For example, with an "Add" insert 20a mounted and displayed on the board 12, as shown in FIG. 1, a separate relatively smaller base or whole number insert card 40a may be inserted under the left-hand retention clip 22, as viewed in FIG. 1, with the left-hand pointer 30 positioned directly therebelow. With the teacher standing to the side of the board, the right-hand pointer 30 may be successively moved along the numbers on the insert 20a to practice the addition of each successive number in the sequence with the number displayed on the base number insert card 40a, with the teacher monitoring the correct answer responses for the students. If desired, relatively small sized "answer" insert cards 40b may be successively positioned under the right-hand clip 22 and be highlighted by a third pointer (not shown). Subtraction may be similarly practiced by an appropriate "Subtract" insert card. Moreover, addition, substraction, and other mathematical relationships can be practiced, with utilization of both pointers, on a simple "Number Line" insert card 20b, as shown in FIG. 5. Multiplication drills may be easily accomplished with a "Multiply" card 20c, in conjunction with base or whole number insert cards 40c, as shown in FIG. 6. Ruler scales as depicted by a "Ruler" insert card 20d, shown in FIG. 7, temperature scales, as depicted in a Fahrenheit Thermometer insert card 20e shown in FIG. 8, and mathematical progressions, as depicted by a "Progression" insert card 20f shown in FIG. 9, may similarly be easily demonstrated to a classroom of students. The scales, of course, are proportioned larger than the actual units of measurement for ease of observation by a classroom of students. Further insert cards 20g-k may depict months of the year (FIG. 10), integers (FIG. 11), time sequences (FIG. 12), the alphabet (FIG. 13), and common lines and shapes (FIG. 14).

From the foregoing, it can be seen that the teaching aid of the present invention is adapted for effectively teaching students various mathematical relationships, measurement increments, progressions, and other sequential and educational information. The teaching aid has enhanced the versatility over prior teaching devices, but yet is relatively simple and inexpensive in construction. Indeed, the insert cards may be interchangeably positioned on the board and stored thereon without the removal or replacement of auxiliary fasteners.

What is claimed is:

1. A visual teaching aid comprising
   a board,
   means for mounting said board on a wall, a plurality of insert cards each having a forward face defined between top and bottom peripheral edges, said insert cards each having indicia on the forward face thereof, said cards being interchangeably mountable on said board with the forward face having indicia thereon forwardly directed,
   means releasably supporting said card when mounted on said board with the forward face entirely free of any obstructions from viewing,
   at least one pointer, and
   means supporting said pointer for movement along said board for pointing to selected indicia on the insert card mounted thereon.

2. The visual teaching aid of claim 1 in which said releasable supporting means supports a plurality of said insert cards on said board in overlying relation to each other with the indicia of a forwardmost insert card forwardly directed such that said pointer points to the indicia on the forwardmost insert card.

3. The visual teaching aid of claim 1 including at least two of said pointers, and means for supporting said pointers for selected positioning with respect to indicia on the forward face of the mounted insert card and with respect to each other.

4. The visual teaching aid of claim 1 in which said insert card supporting means permits mounting and removal of said insert cards on said board without removal and replacement of auxiliary fasteners.

5. The visual teaching aid of claim 1 in which said pointer supporting means is a single elongated track.

6. The visual teaching aid of claim 5 in which said board has an elongated configuration and is mountable horizontally on said wall, and said insert cards each have elongated configurations.

7. A visual teaching aid comprising
   an elongated board,
   a plurality of insert cards each having different indicia on a face thereof, releasable supporting means supporting a plurality of said insert cards on said board in overlying relation to each other with the indicia of a forwardmost card forwardly directed,
   a pair of identically configured pointers each having a terminal tip,
   a single track for supporting said pointers for movement along a length of said board and said forwardmost insert card mounted thereon, said track supporting said pointers such that the terminal tips thereof are positioned adjacent a peripheral edge of said forwardmost insert card without obstructing viewing of indicia on the forwardmost card, said pointers being individually positionable on said track for pointing to selected indicia on said forwardmost card such that relationships between selected indicia on said forwardmost card may be selectively presented.

8. The visual teaching aid of claim 7 in which said insert card has a scale along the length thereof depicting known units of length proportionately larger than the actual units.

9. The visual teaching aid of claim 7 in which said insert card has indicia thereon depicting a legend of numbers.

10. The visual teaching aid of claim 7 in which said insert card has indicia thereon depicting the addition of numbers.

11. The visual teaching aid of claim 7 in which said insert card has indicia depicting the multiplication of numbers.

12. The visual teaching aid of claim 7 in which said insert card has indicia thereon in the form a temperature scale.

13. The visual teaching aid of claim 7 in which said insert card depicts months of the year.

14. The visual teaching aid of claim 7 in which said insert card depicts integers.

15. The visual teaching aid of claim 7 in which said insert card depicts a time sequence.

16. The visual teaching aid of claim 7 in which said insert card depicts the alphabet.

17. The visual teaching aid of claim 7 in which said insert card depicts common lines and shapes.

18. The visual teaching aid of claim 7 in which said insert card releasable supporting means includes a plurality of generally L-shaped, flexible retention clips each secured to an upper end of said board and each having a depending leg releasably engaging an upper peripheral portion of an insert card mounted on the board.

19. The visual teaching aid of claim 18 including generally L-shaped reinforcing clips mounted in overlapping relation about said L-shaped retention clips for preventing excessive bending of said retention clips.

20. The visual teaching aid of claim 18 in which said retention clips are made of transparent material.

21. The visual teaching aid of claim 19 in which said retention and reinforcing clips are made of transparent material.

22. The visual teaching aid of claim 19 in which said retention clips and reinforcing clips each are formed with a pair of legs which define acute angles.

23. A visual teaching aid comprising
   a board,
   means for mounting said board on a wall, a plurality of insert cards each having numerical indicia on a face thereof, said cards being interchangeably mountable on said board with the face having indicia thereon forwardly directed, means releasably supporting said card when mounted on said board, at least one pointer, means supporting said pointer for movement along said board for pointing to selected indicia on the insert card mounted thereon, said pointer supporting means including an elongated track, a slide mounted for relative movement in said track, means for securing said pointer to said slide, and adjustable means for selectively effecting a predetermined frictional drag between said slide and track for preventing unrestricted free movement therebetween.

24. The visual teaching aid of claim 23 in which said slide includes a mounting flange, said pointer securing means includes a pair of laterally spaced fasteners, and said mounting flange includes dimple means disposed between said fasteners which upon tightening of said fasteners causes said mounting flange to bow about said dimple means and frictionally engage said track.

25. The visual teaching aid of claim 24 in which said track is formed with a forwardly extending flange for causing said pointer to be disposed angularly with respect to a forward face of said board with a pointed end thereof in close relation to said board and an insert card mounted thereon.

26. The visual teaching aid of claim 25 in which said bowed portion of said pointer mounting flange is engageable with said forwardly extending flange portion of said track.

27. The visual teaching aid of claim 24 in which said dimple means comprise a plurality of forwardly extending dimples.

28. A visual mathematical teaching aid comprising an elongated board, a plurality of elongated insert cards each having different numerical indicia on a face thereof, releasable supporting means supporting a plurality of said insert cards on said board in overlying relation to each other with the numerical indicia of a forwardmost insert card forwardly directed, a plurality of base number cards each sized smaller than said elongated insert cards and having a different single base number thereon, said base number cards being interchangeably mountable on said board in overlapping relation to said forwardmost insert card and usable in conjunction therewith two pointers, and means supporting said pointers for selected movement along said board for pointing to selected indicia on said forwardmost insert card and the base number card mounted thereon and for movement relative to each other for demonstration of the numerical relationships between selected numerical indicia on said insert and base number cards.

29. The visual teaching aid of claim 28 including insert card supporting means for permitting mounting and removal of said insert cards on said board without removal and replacement of auxiliary fasteners.

30. The visual teaching aid of claim 29 in which said insert card supporting means includes a plurality of generally L-shaped, flexible clear plastic retention clips each secured to an upper end of said board and each having a depending leg releasably engaging an upper peripheral portion of an insert card mounted on the board.

31. The visual teaching aid of claim 28 in which said pointers supporting means includes an elongated track, a slide mounted for relative movement in said track, means for securing said pointer to said slide, and means for selectively effecting a predetermined frictional drag between said slide and track for preventing unrestricted free movement therebetween.

32. The visual teaching aid of claim 28 in which said supporting means is a single common track for supporting said pointers for sliding movement.

33. A visual mathematical teaching aid comprising an elongated board, a plurality of elongated insert cards each having different mathematical indicia on a face thereof, said cards being interchangeably mountable on said board with the face having mathematical indicia thereon forwardly directed, a plurality of base number cards each sized smaller than said elongated insert cards and each having a different base number thereon, said base number cards being interchangeably mountable on said board in predetermined relation to one of said mounted elongated insert cards and usable in conjunction with said mounted elongated insert card, two pointers, and means supporting said pointers for selected movement along said board for pointing to selected indicia on the insert card and base number card and for movement relative to each other for demonstrating the mathematical relationship between indicia on said insert and base number cards.

34. The visual teaching aid of claim 33 in which one of said insert cards has indicia thereon depicting the addition of numbers.

35. The visual teaching aid of claim 7 in which one of said insert cards has indicia depicting the multiplication of numbers.

36. The visual teaching aid of claim 33 in which said cards each have substantially the same length as said elongated board.

37. The visual teaching aid of claim 36 in which a single track supports said pointers.

38. The visual teaching aid of claim 37 in which said track has substantially the same length as said insert cards.

39. A visual teaching aid comprising a board, means for mounting said board on a wall, a plurality of insert cards each having different numerical indicia on a face thereof, said insert cards being interchangeably mountable on said board with the face having indicia thereon forwardly directed, means releasably supporting said card when mounted on said board, at least one pointer, means supporting said pointer for movement along said board for pointing to selected indicia on the insert card mounted thereon, at least one base number card sized smaller than said insert cards and having a single base number thereon, and said base number card being selectively mounted on said board in predetermined overlying relation to an insert card mounted on said board without obstructing viewing of indicia on the underlying insert card and usable in conjunction with the underlying insert card for demonstrating the numerical relationship between the indicia on the mounted insert card and base number card.

* * * * *